No. 758,987. PATENTED MAY 3, 1904.
M. E. LOOSE.
METHOD OF TREATING WOOD FIBER FOR USE IN PLASTER.
APPLICATION FILED OCT. 23, 1902.
NO MODEL.
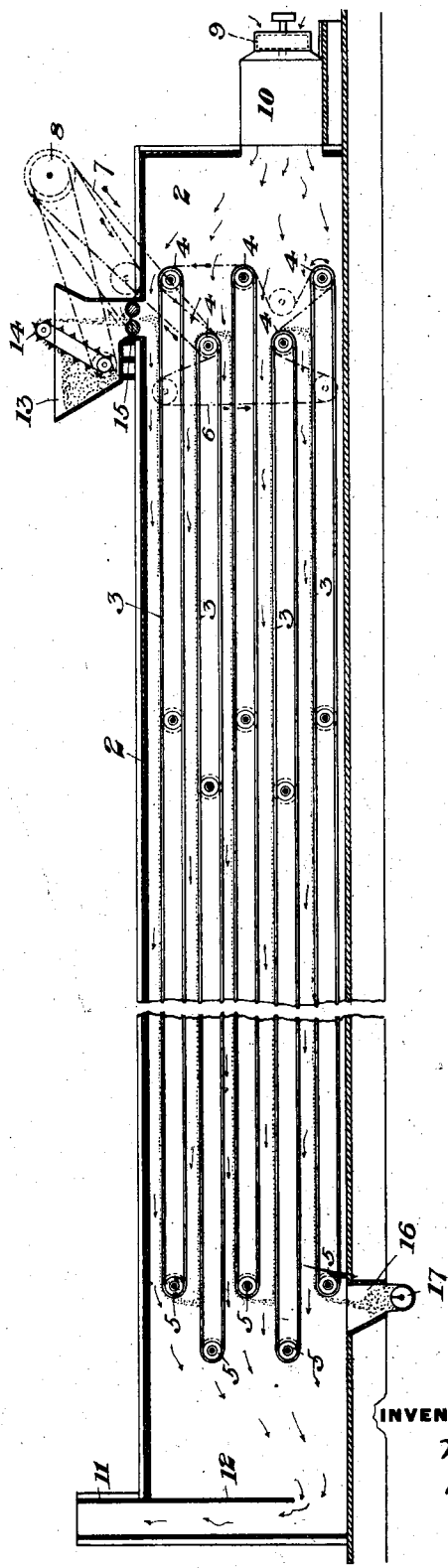
WITNESSES
INVENTOR No. 758,987. Patented May 3, 1904.

UNITED STATES PATENT OFFICE.

MAXIMUS E. LOOSE, OF NAPOLEON, OHIO.

METHOD OF TREATING WOOD FIBER FOR USE IN PLASTER.

SPECIFICATION forming part of Letters Patent No. 758,987, dated May 3, 1904.

Application filed October 23, 1902. Serial No. 128,458. (No specimens.)

*To all whom it may concern:*

Be it known that I, MAXIMUS E. LOOSE, of Napoleon, Henry county, Ohio, have invented a new and useful Method of Treating Wood Fiber for Use in Plaster, of which the following is a full, clear, and exact description, reference being had to the accompanying drawing, forming part of this specification, in which the figure is a sectional side elevation, showing my preferred form of apparatus for desiccating.

My invention relates to the treatment of wood fiber, and is especially designed in preparing it for plaster mixtures to prevent the premature setting of the mixture in packages.

Heretofore in wood-pulp or wood-fiber plasters the fiber has been severed from the block and then mixed with the other ingredients. I have found that when wood-pulp or wood-fiber plasters are made in this way, especially when green wood is used, the dry plaster mixture will absorb moisture and will deteriorate or set in the bag or packages, and the quality of the plaster is thereby injured.

My invention overcomes this difficulty; and it consists in desiccating or hot-drying the woody particles before the mixture is made.

It also consists in the steps hereinafter described and claimed.

In carrying out my process I desiccate the wood-pulp or wood fiber by subjecting it to the action of heated gases, preferably air, whereby the solid and colloid constituents of the juices or sap are retained in the particles. In the drawing, in which I show one form of apparatus for carrying out this step, 2 represents a desiccating-chamber, which may be of any desirable form and which contains a series of endless conveyers 3. These conveyers are preferably made in the form of sprocket-chains, with wooden blocks fastened thereon to carry the fiber, and are arranged so that the fiber drops from the end of one conveyer upon the next, where it is carried in the opposite direction and drops upon the end portion of the next conveyer, thus being given several passes in opposite directions within the heated atmosphere. I have shown the conveyers as moving over end pulleys or sprocket-wheels 4 and 5, the wheels 4 being driven by intermediate belting or chain connections 6 and a belt or chain 7, extending from one of the shafts to a driving-shaft 8. I have shown the air as forced in by a mechanical blower, (indicated at 9,) the air passing from the blower into the heating-chamber 10, containing suitable radiators or heating pipes or coils. The heated air passes from this heater into one end of the chamber 2 and out at the other end through an outlet 11, which preferably has a baffle 12 extending within the chamber. I have shown the pulp or fiber as being fed from a hopper 13 by an endless conveyer 14, which drops the material between rollers 15 and thence upon the upper belt or conveyer. The conveyer 14 and the rollers 15 are preferably driven from the shaft 8 by belting or flexible connections, as indicated in dotted lines.
The desiccating-chamber may be covered with any suitable non-conductor to decrease radiation. From the lowermost belt the fiber drops through a chute 16 into a horizontal trough containing a screw 17, whence it is conveyed, preferably by a suction-pipe, to the mixing-machine. The dry-kiln or heating-chamber is preferably heated to about 190° to 210° Fahrenheit, and the carriers are preferably arranged so that the material is retained in the chamber from twenty to thirty minutes. The desiccated pulp or fiber is then mixed with the other dry ingredients of the plaster, and the mixture is then bagged or put up in suitable packages for shipping.

The advantages of my invention result from the desiccating of the wood fiber or pulp, since thereby the woody particles are brought into such condition that the mixture will preserve its normal consistency and condition. The solid and colloid constituents of the juices of the wood are retained, and when the mixture is mixed with water for use these constituents aid in giving the proper consistency for application to the wall.

By the word "desiccating" in my claims I mean drying the fiber and at the same time heating it, thus preserving the juices, as before described. This desiccating or hot-drying is quickly accomplished at a comparatively high temperature and has what may be described as a "searing" effect upon the surface of the fiber particles, which locks up and preserves within those particles the albuminous or colloid constituents of the vegetable juices until they are liberated by the remoistening of the plaster materials preparatory to their application to the wall.

Many changes may be made in the form and arrangement of the dry-kiln or desiccating apparatus, as well as in the plaster mixture where the fiber is used with plaster, without departing from my invention.

I claim—

1. The method of making plaster, consisting in rapidly hot-drying woody fiber to desiccate it and preserve the solid or colloid constituents of its juices and then mixing the desiccated fiber with dry powdered plaster materials to prevent premature setting of the mixture in bulk; substantially as described.

2. The method of making wood-fiber plaster, which consists in rapidly hot-drying the fiber, while preserving its colloid constituents, and then mixing the desiccated fiber with the other dry, pulverulent, plaster-forming material, whereby the premature setting of the plaster in bulk is obviated; substantially as described.

In testimony whereof I have hereunto set my hand.

MAXIMUS E. LOOSE.

Witnesses:
M. S. HUDSON,
T. C. CLEWELL.